INVENTOR
M. KARNAUGH
BY John K. Mullarney
ATTORNEY

United States Patent Office 3,457,372

Patented July 22, 1969

3,457,372

TIME DIVISION SWITCHING CENTERS HAVING MUTUALLY CONTROLLED OSCILLATORS

Maurice Karnaugh, New Providence, N.J., assignor to Bell Telephone Laboratories, Incorporated, New York, N.Y., a corporation of New York Filed Nov. 24, 1965, Ser. No. 509,532
Int. Cl. H04j 3/06
U.S. Cl. 179—15 13 Claims

ABSTRACT OF THE DISCLOSURE

The oscillator in each switching center of a time division multiplex system is synchronized by having its frequency interact with the oscillators in all of the other centers of the system to which the oscillator's center is connected by incoming and outgoing communication links. Each incoming link to a center is series connected with a variable delay device which inserts varying amounts of delay in the path of the incoming signal in accordance with the difference between the phase of the incoming signal and the signal provided by the local oscillator. A voltage is developed for each delay device whose magnitude is a specific nonlinear function of the delay device position. The frequency controlling signal for the oscillator in each center is derived from a summation of the developed voltages for the delay devices within that center minus a summation of the voltages for the delay devices in all other centers which terminate the outgoing links from that center.

This invention relates to time division multiplex communications systems. More particularly, the invention relates to time division multiplex systems wherein the oscillators which provide timing control at the switching centers are mutually controlled or "organically" synchronized, that is, the oscillator in each center has its frequency regulated by an interaction with the oscillators in all other centers to which the center is connected.

For correct operation of switching and decoding in a time division multiplex system, the incoming information-bearing signals must be phase synchronized, or "framed," with the timing control oscillator. In order to compensate for phase fluctuations in the oscillator and for variations in the delay of the transmission links which connect the centers, each center has at the termination of each incoming link a variable delay device which inserts varying amounts of delay in the path of the incoming signal in accordance with the difference between the phase of the incoming signal and the signal provided by the local timing oscillator. One method of controlling the amount of variable delay is by means of a phase comparator which has at one input, the signal from the local timing oscillator, and at the other input, the signal from the output of the variable delay device. An error signal produced by the phase comparator causes the variable delay device to increase or decrease in delay by the proper amount so as to cause the signal at the output of the delay device to be equal in phase to that of the local timing oscillator. This type of phase synchronization of the incoming signal with the local timing oscillator in a time division multiplex system wherein the oscillators are mutually controlled can be found in the system described in Patent No. 3,050,586 of Aug. 21, 1962 to J. P. Runyon.

Since phase is simply the integration of frequency with time, a change in frequency of the local oscillator will cause all variable delay devices within the center to gradually alter the amount of delay which they present to the incoming links. Accordingly, one method of organically synchronizing the local oscillator in the prior art has been to form a frequency controlling signal for the local oscillator which is a function of the variable delay device positions. A voltage is developed for each delay device which is linearly proportional to the position of the variable delay device. The voltages from all of the delay devices within a center are combined in a voltage summing network to provide a frequency controlling signal to the local oscillator. If then the local oscillator changes in frequency, a corresponding change occurs in the voltage applied to the oscillator which in turn causes the oscillator to return to the proper frequency. In addition to this "near end" type of control which has been described hereinabove, that is, where the frequency determining signal is dependent on the positions of the delay devices in the local center only, the frequency determining signal can, in addition, be made dependent on the positions of the delay devices in the remote centers at the terminating end of all outgoing links. This type of both "near end" and "far end" control of the local oscillator can be found in "Research Study of Synchronization in Digital Switching System," a final report by the International Telephone and Telegraph Company, AD 444,244, on contract number DA-36-039-sc-90740, Department of the Army Project 3A99-12-001, covering the period of July 1, 1963 to Apr. 30, 1964.

If the oscillators in connected centers have a constant common frequency, and if the transmission links connecting the centers have constant delays, then the variable delay device terminating each link will remain at a fixed position determined by the phase of each of the oscillators and the amount of delay in the link which connects the centers. If, however, either of the oscillators changes in frequency or if the delay of the transmission medium between the centers changes, then the variable delay device is forced to change so as to maintain phase synchronization. It should be apparent that since transient changes in delay may be required in either direction and since realizable variable delay devices have a finite amount of delay, it is advantageous to operate a variable delay device at its midrange position, that is to say, midway between its maximum and minimum possible delay.

The frequency of each oscillator is determined by its natural resonant frequency and by the potential supplied to it by the frequency determining signal. The oscillators in a system usually will have slightly different natural resonant frequencies in which case the valve of potential supplied by each frequency determining signal must differ in order to have the entire system at a single frequency. In addition, the links which connect the transmission centers are subject to changes in delay with time which are caused by physical conditions such as temperature changes in cables and alterations in their lengths. Consequently, the variable delay devices will usually achieve equilibrium positions which are different from their midrange positions. Some of the delay devices may even achieve positions which correspond to their nearly full or nearly empty condition, in which case a transient on its respective incoming link can cause the delay device to attempt to achieve a position which is unattainable and accordingly cause an error in decoding or switching the incoming information-bearing signal.

One object of the present invention is to provide a time division multiplex (hereinafter abbreviated TDM) system wherein a broader range of possible initial conditions in terms of oscillator natural resonant frequencies and variable delay device positions is tolerable.

Another object is to provide a TDM system wherein the variable delay device which is closest to its maximum or minimum delay has a dominant voice in determining the direction in which the oscillators shall move in frequency.

These and other objects are achieved in accordance with the present invention wherein the frequency-controlling voltage developed by each variable delay device in the centers of a TDM communication system having mutually controlled oscillators is a specific nonlinear function of the deviation of the variable delay device from its midrange position. More particularly, the voltage developed by each variable delay device, when expressed as a mathematical function of the variable delay device position has the following characteristics: where $x$ is a variable expressing deviation of the variable delay device from its midrange position, the developed voltage for negative values of $x$ is equal in magnitude but opposite in polarity to the voltage for positive values of $x$, and the absolute value of the rate of change of voltage with respect to $x$ is an increasing function for increasing absolute values of $x$.

The invention will be fully apprehended from the following detailed description of illustrative embodiments thereof taken in connection with the appended drawings, in which.

Figure 1:
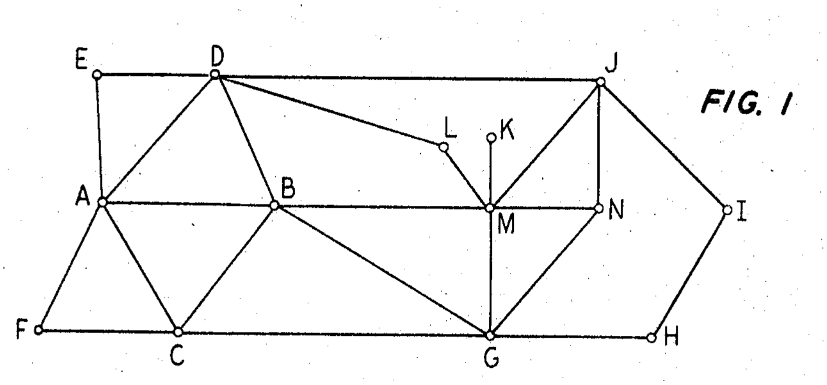
FIG. 1 is a schematic representation of a web or network of interlinked telephone switching centers.

Referring now to the drawings, FIG. 1 is a schematic representation of a web network of the sort in which the invention is advantageous. It comprises a web of switching centers, represented by small circles and individually identified, each interconnected with at least one of the others by a two-way communication link, here represented by a single straight line. It is contemplated that in practice the web network may be smaller or larger than the one shown; it may include some hundreds or even thousands of switching centers.

Figure 2:
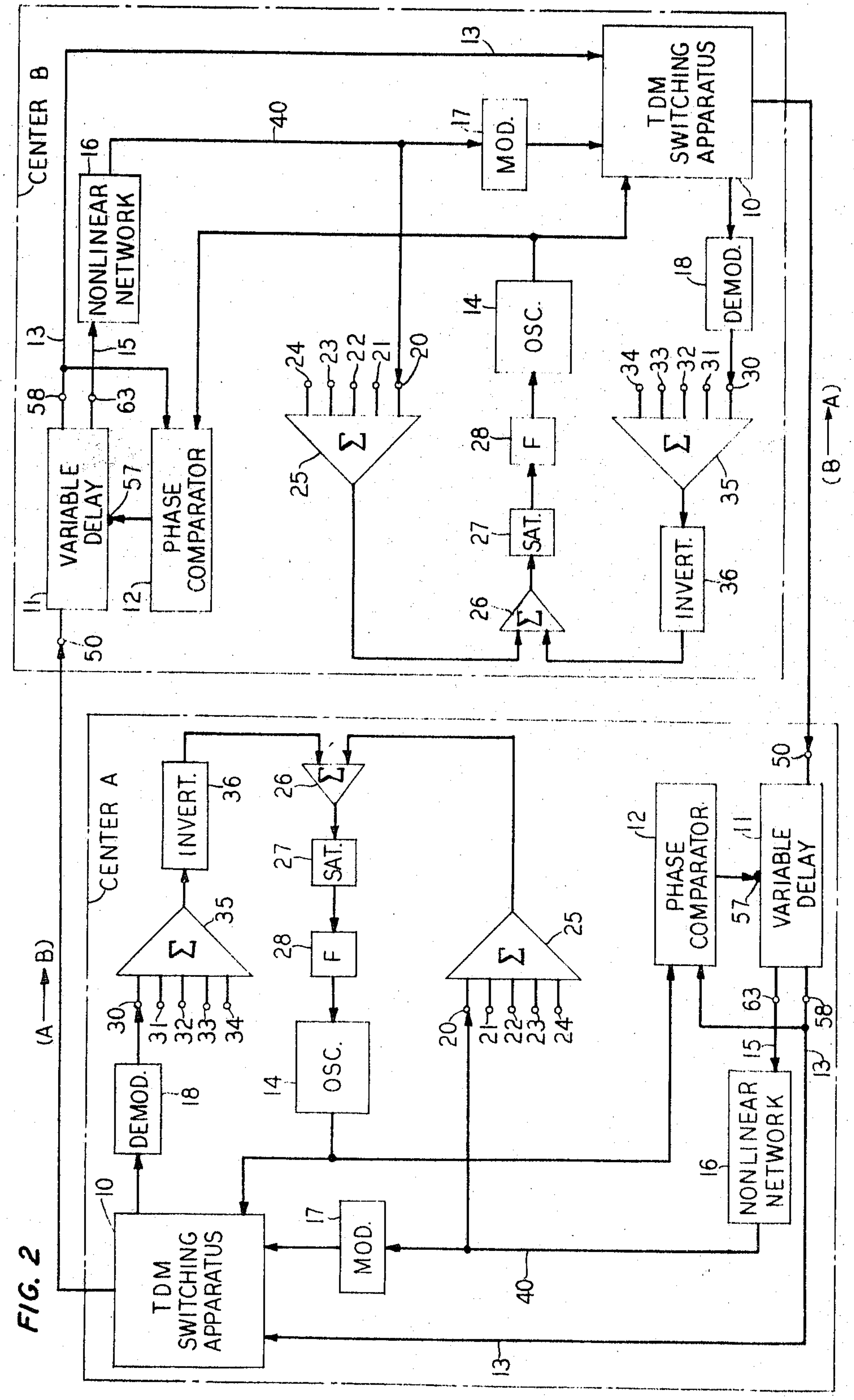
FIG. 2 is a schematic block diagram showing two centers of the web of FIG. 1.

Feferring now to FIG. 2 this figure shows in block form two of the switching centers designated as A and B from the web network shown in FIG. 1, and illustrates the principal apparatus components of each one, and a two-way communication link extending between the centers. To stress the similarities among the apparatus components in the several centers, they are similarly arranged and designated by like reference characters.

The purpose which the invention serves is to provide fully compatible timing controls to govern all the operations of switching and the like at the several centers. The switching apparatus itself and the manner in which it operates while it may be exceedingly complex is nevertheless conventional and forms no part of the invention. Accordingly, all of this apparatus has been grouped together at each center in a single box 10 designated "TDM Switching Apparatus." It is to be understood that in practice this apparatus includes all of the communication lines incoming from and outgoing to individual subscribers located in the vicinity of the center as well as TDM trunks, or "links," incoming from and outgoing to all the centers of the web with which the center in question is in fact linked, and also all the instrumentalities interposed, in the center, between the lines and the TDM links. As indicated above, and for the sake of simplicity of the drawings and of the explanation, only one such link is shown in the case of FIG. 2.

Incoming link from center A designated as (A→B) terminates in the variable delay 11 of center B and the link designated as (B→A), originating in the TDM switching apparatus 10 of center B, terminates in the variable delay 11 of center A. It is contemplated that each of these links shall carry message information in pulse code form, for example, binary pulse code in which the significance of each pulse be it a mark or a space both from a standpoint of its digit value or denominational order and from the standpoint of its intended destination as between various subscribers is determined solely by the particular time slot at which it occurs, that is to say, by its precise position in a repetitive cycle or frame. Hence, for correct operation of decoding in switching apparatus 10, it is imperative that such apparatus be precisely controlled as to time.

Referring now particularly to center B in the right half of FIG. 2, the coded information on the link coming from center A after passing through variable delay 11 emerges on line 13 and enters TDM switching apparatus 10. In order for the pulse codes on line 13 to be correctly processed, the proper phase relationship must exist between the arriving framed code and the signal from oscillator 14 which determines the timing of all switching actions in TDM switching apparatus 10. This phase synchronization is achieved through the action of variable delay 11 and phase comparator 12. The output of oscillator 14 in addition to being connected to TDM switching apparatus 10 is also connected to one input of phase comparator 12, while the other input is connected to receive the signal on line 13 from variable delay 11. Phase comparator 12, which may be of any well-known construction, delivers an output that is representative of the phase discrepancy between the output wave of local oscillator 14 and the signal appearing on line 13. The output of phase comparator 12 is connected as an error signal to terminal 57 of variable delay 11 and causes the latter to increase or decrease the amount of delay presented to the incoming signal so as to decrease the error signal on terminal 57. In addition, variable delay 11 provides on line 15 in a manner to be described hereinafter a voltage which is a function of the amount of delay presented.

Figure 3:
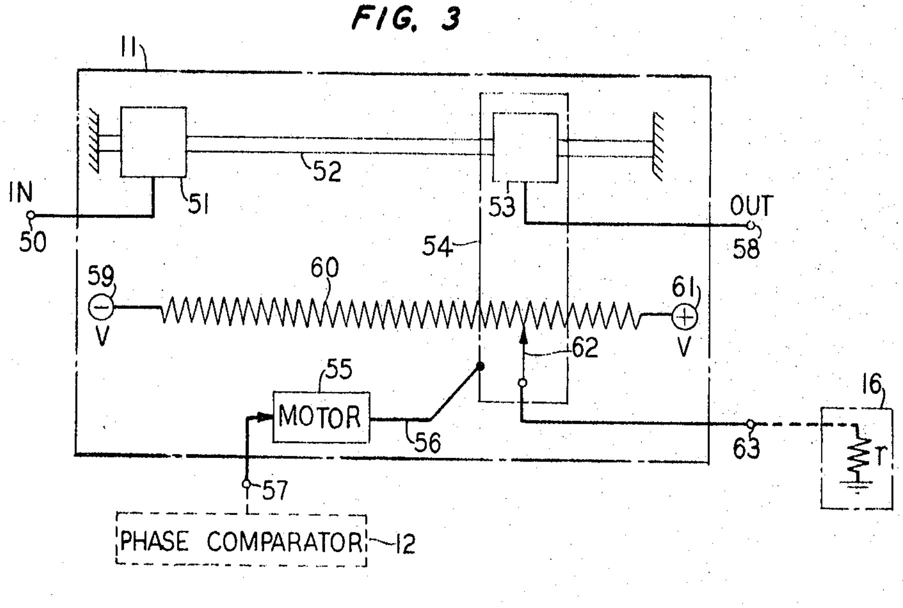
FIG. 3 is a schematic block diagram of one possible embodiment for the variable delay device shown as a block in each center of FIG. 2.

One possible embodiment for variable delay 11 is shown in block schematic diagram form in FIG. 3. This is the type of variable delay or elastic delay line which can be found more fully described in Patent 2,960,571 to W. A. Malthaner, granted Nov. 15, 1960. Referring now to FIG. 3 the pulse code information on the link from center A is connected to input terminal 50 and delivered to input transducer 51 of delay line 52. Delay line 52 advantageously may be in the form of any of the well-known magnetostrictive rod, wire, or tube elements. The signals applied to transducer 51 set up the well-known acoustic propagation of impulses in delay line 52, which impulses upon reaching movable output transducer 53 are therein converted back into electrical signal pulses. The length of time transpiring between the introduction of the pulses at transducer 51 and their reappearance at the output of transducer 53 is the utilized time delay of the delay line 52 and is proportional to the length of delay line 52 between transducers 51 and 53. The delayed electrical signals at the output of transducer 53 are delivered to output terminal 58 which in turn is connected in FIG. 2 to the TDM switching apparatus 10. Movable transducer 53 is mounted on a platform shown in FIG. 3 as dotted enclosure 54 which in turn is moved by operation of motor 55 connected to platform 54 by way of mechanical linkage 56. Motor 55 operates in response to a signal on terminal 57 which in turn is connected to the output of phase comparator 12. Thus, when a difference exists between the phase of the arriving framed code on line 13 and the phase of the signal from local oscillator 14, an error signal is delivered by phase comparator 12 to motor 55 which causes platform 54 to be moved until the appropriate amount of delay is inserted so as to reduce the phase discrepancy between the two signals to zero.

Also shown in FIG. 3 is elongated resistance element 60 having a potentiometer arm 62 which is in electrical contact with resistance element 60 and mechanically mounted on platform 54. Resistance element 60 is physically as long as delay line 52 and positioned with respect to the delay line so that platform 54 causes potentiometer arm 62 to move along resistance element 60 proportionately with movements of output transducer 53 along delay line 52. Thus, with a negative potential applied to point 59, one end of resistance element 60, and a positive potential applied to point 61, the other end of resistance element 60, movements in platform 54 will cause a change in potential on potentiometer arm 62 which is in turn connected to output terminal 63. The potentials connected to points 59 and 61 are made equal in value, and therefore the potential at output terminal 63 when output transducer 53 is at its midrange position will be equal to zero. Deviations by output transducer 53 in either direction from the midrange position will cause a positive or negative potential to appear at output terminal 63.

Returning now to center B in FIG. 2 the potential at output terminal 63 which is indicative of the position of variable delay 11 is connected by way of line 15 to network 16. Network 16 in a manner to be described hereinafter provides a signal on line 40 whose amplitude is a nonlinear function of the delay device position. The specific type of nonlinearity which is desirable will also be hereinafter described.

The signal on line 40 whose polarity and amplitude indicate the position of variable delay 11 is coupled to input 20 of summation amplifier 25. The other inputs 21–24 of summation amplifier 25 are connected to networks similar to network 16 which in turn are connected to variable delays at the termination end of links coming to center B from centers other than center A. Thus, the polarity and amplitude of the signal at the output of summation amplifier 25 is determined by the prositions of all of the variable delays in center B. The output of amplifier 25 is connected by way of the two-input summation amplifier 26 to saturator 27 which in turn provides a saturation function, that is, an equality between the input and output up to a certain predetermined absolute value of input signal, beyond which the output is clamped or limited to a constant value. The action of saturator 27 is desirable in preventing the signals supplied by amplifier 26 from pulling or changing the frequency of local oscillator 14 beyond predetermined maximum limits. Between the output of saturator 27 and the voltage-sensitive terminal of oscillator 14, filter 28 is connected in order to provide a high frequency attenuation characteristic which will enhance the stability of the over-all system.

If the delay in the transmission links is relatively constant and the primary consideration is to control the frequencies of the oscillators in each center, then "near end" control may be all that is necessary. That is to say, the oscillator in each center can have its frequency determined by the position of the variable delays within its respective center by having the output of summation amplifier 25 connected directly to the input of saturator 27. Assuming such a system for illustrative purposes with only two centers, if the oscillator in center A suddenly changes toward a higher natural resonant frequency, the variable delay in center A responds by decreasing the amount of delay and correspondingly changing the signal to the voltage sensitive terminal of the oscillator so as to cause the oscillator to decrease from its newly found frequency. In addition, the increased frequency of oscillator A increases the rate of transmission over the link from A to B and causes variable delay 11 in center B to increase its amount of delay and send a corresponding signal to the oscillator in center B which causes the latter oscillator to increase its frequency. Consequently, a change in the natural resonant frequency of the oscillator in center A would cause both oscillators to compromise on a new frequency for the entire system which is somewhere between the old established frequency of the system and the newly desired frequency of the oscillator in center A. On the other hand, assume that both oscillators remained stable but a decerase in the amount of delay which is present in the link from center A to center B occurs. As a result, variable delay 11 in center B would increase the amount of delay and send a corresponding signal by way of line 40 to oscillator 14 in center B requiring the oscillator to increase in frequency. This in turn causes a higher rate of transmission from center B to center A, in turn causing variable delay 11 in center A to increase the amount of delay and send a corresponding signal to oscillator 14 in center A to increase its frequency. Consequently, both oscillators would increase in frequency as a result of a change in the delay of a transmission link connecting them, and thereby establish a new frequency for the system even though the natural resonant frequency of neither oscillator has changed. Several changes of this type in the same direction could cause the system to run the oscillators to outer limit frequencies at which very little control is possible.

To avoid this type of difficulty it is advantageous to have the local oscillator in each center controlled not only by the position of the variable delay devices in its respective center but also by those delay devices in the remote centers to which the outgoing links are connected. To achieve this type of control, line 40 carrying the signal information relating to the position of delay device 11 is also connected to a conventional modulator 17 which changes the slowly varying D.C. found on line 40 to a signal which may be processed by the TDM switching apparatus 10. This information is transmitted by the system to the center from which the pulse coded information received by the delay device has originated. For example, in case of FIG. 2 where variable delay 11 in center B has its position determined by the pulse coded information from center A, the signal from modulator 17 in center B is sent over the link (B→A) to TDM switching apparatus 10 in center A, demodulated by demodulator 18 in center A, and connected to input terminal 30 of summation amplifier 35. For similar information on line 40 in center A, the signal from modulator 17 in center A is transmitted by way of the link (A→B) to TDM switching apparatus 10 in center B at which point demodulator 18 processes the information and connects the signal to input 30 of summation amplifier 35 in center B. The other inputs 31 through 34 of summation amplifier 35 are connected by way of similar demodulators to obtain information relating to hte position of the variable delay devices in all other centers to which the center of intrest is connected. Thus, the output of summation amplifier 35 in any given center provides a signal whose amplitude and polarity is determined by the positions of all of the variable delay devices in all other centers to which the center of interest is connected. To obtain the proper type of control which will be hereinafter described, the polarity of the signal at the output of amplifier 35 must be inverted by inverter 36 before being combined with the output from amplifier 25.

As a result of this so-called "near end" and "far end" control of the oscillators, any change in frequency of an oscillator which is called for by the local delay device tends to be counteracted by the fact that the delay device produces an opposite effect on the frequency of the remote oscillator. The system frequency thereby tends to remain with reasonable limits. For example, suppose as in the example given hereinabove, the delay in the transmission link between center A and center B decreased Variable delay 11 in center B would increase in delay thereby calling for an increase in the frequency of the center B. Any increase in the frequency of oscillator 14 in center B increases the transmission rate from center B to center A thereby causing an increase in the delay of variable delay 11 in center A. This latter increase would in the case of "near end" control only, order an increase in the frequency of the center A oscillator, but in the instant case of "near end" and "far end" control, the order is counteracted by an order from the center B delay device to decrease the frequency of the center A oscillator. Oscillator 14 in center A therefore tends to remain at the same frequency, and the center A delay device sends back an order to the center B oscillator to decerase frequency. Accordingly, after a time interval roughly equal to the delay time of the two-way link between centers A and B, the order from the delay device within center B to increase the frequency of the oscillator in center B is counteracted by an order from the remote delay device in center A, and oscillator 14 in center B tends to return to the same frequency. Any change in the natural resonant frequency of either of the oscillators would however, as in the case of "near end" control only, still cause both oscillators to move in a direction toward a compromise frequency.

From the brief illustrations given hereinabove in connection with the operation of the system, those skilled in the art can easily appreciate that for real systems in which delay changes occur in the transmission links, and in which the oscillators have unequal natural resonant frequencies, variable delay positions other than at midrange can easily be achieved in the equilibrium state. It can also be appreciated that since the variable delay devices have finite capacity, any changes in the system which would cause the variable delays to attempt to go beyond either their minimum or maximum capacity would result in errors in timing and data processing for the particular channel being processed by that variable delay device. As was pointed out hereinabove, one object of the present invention is to permit a broader range of initial conditions in both the delay device positions and in the natural resonant frequences of oscillators. Although the advantages of the instant invention can be shown mathematically to be present both in systems which have "near end" control only and in systems which have "near end" and "far end" control, it is much easier to illustrate the operation of the instant invention in a system which has "near end" control only.

Figure 5:
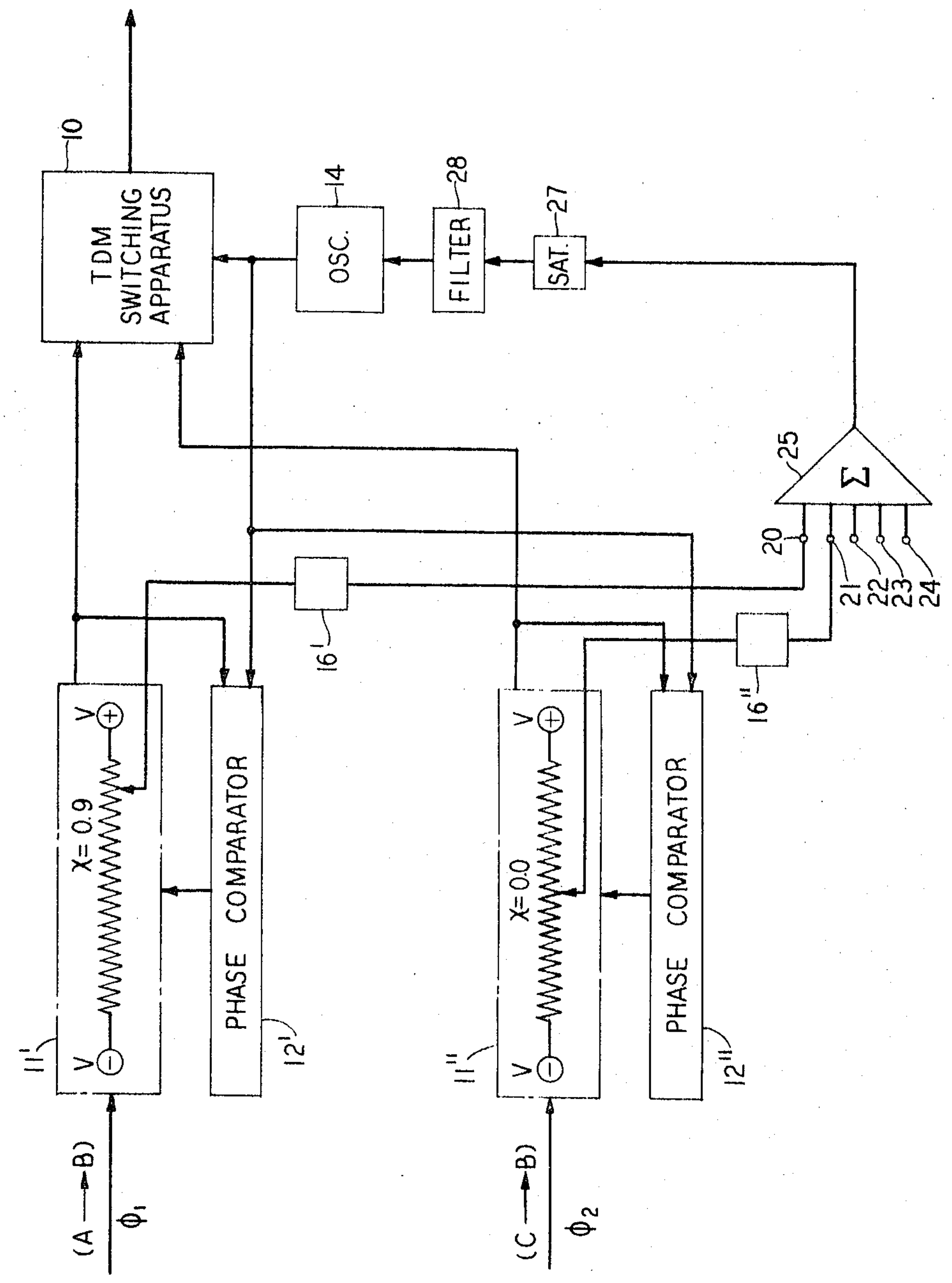
FIG. 5 is a schematic block diagram which is useful in illustrating the advantages attained in accordance with the instant invention.

Referring now to FIG. 5 a portion of center B is shown in a system which has "near end" control only. A transmission link from center A to center B is shown terminating in variable delay 11′ the output of which is connected to TDM switching equipment 10. Also shown is a transmission link from center C to center B terminating in variable delay 11″, the output of which is also connected to TDM switching equipment 10. The potential information which indicates the position of variable delays 11′ and 11″ is coupled by way of networks 16′ and 16″ to inputs 20 and 21, respectively, of summation amplifier 25. Other variable delay devices of course may also be present in center B, and if present, will have their positional information connected by way of similar networks to inputs 22 through 25 of summation amplifier 25. For the purposes of the instant illustration, only the two delay devices which are shown need be considered. The operation of all other components shown in FIG. 5 is the same as described hereinabove.

Assume that the system has achieved equilibrium with variable delay 11′ at 90 percent of its maximum possible deviation from its midrange position, and variable delay 11″ is at its midrange position. Assume also that a decrease in the amount of delay in the transmission link from center A to center B takes place such that an increase of 5 percent would be required in variable delay 11′ in order to maintain phase synchronization with the signal from local oscillator 14. In addition, assume that an increase in the delay in the transmission link from center C to center B takes place such that a decrease in the position of variable delay 11″ of 10 percent would be required in order to maintain phase synchronization of the signal at its output. These changes and positions can be expressed in terms of a variable $x$ where $x$ has permissible values from minus one to plus one. The initial equilibrium condition for variable delay 11′ is $x=.9$ and the position for variable delay 11″ is $x=0.0$. If networks 16′ and 16″ provide a voltage at the input of summation amplifier 25 which is a linear function of the delay device position, that is, $v=kx$ where $k$ is a constant and $v$ is the voltage provided, then changes in position of $\Delta x$ in the delay device would result in a potential change of $$\Delta v=k\Delta x$$

The increase of $\Delta x=+.05$ in variable delay 11′ by itself would call for an increase in the frequency oscillator 14, whereas the decrease of $\Delta x=-0.10$ in variable delay 11″ would by itself call for a decrease in the frequency of oscillator 14. If the controls are linear as described hereinabove, the change of 10 percent in variable delay 11″ would dominate the 5 percent change in variable delay 11′ and cause a decrease in the frequency of oscillator 14, thereby resulting in an even further increase in the position of variable delay 11′ toward its maximum possible deviation from midrange position. If on the other hand the voltage characteristic produced by networks 16′ and 16″ is nonlinear, for example if $v=kx^3$, then a change of $\Delta x$ in the delay device position results in output voltage change of $\Delta v=3kx^2\Delta x$, and the variable delay device at the most extreme position, that is, with $x$ close to unity, will have the greater control over which way the oscillator moves in frequency. In the example given hereinabove the variable delay device which is at 90 percent of its maximum deviation from its midrange position would dominate and cause the oscillator to increase in frequency so as to prevent this delay device from attempting to exceed its maximum possible delay.

Figure 4:
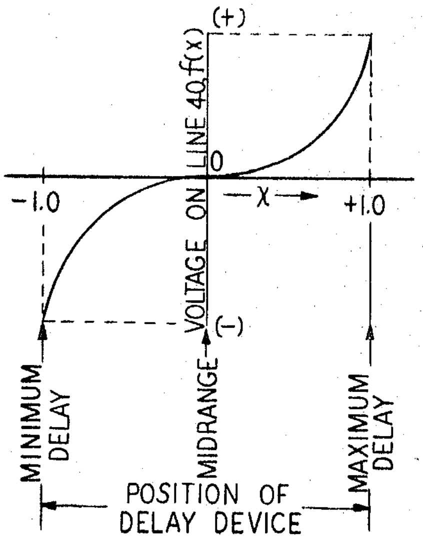
FIG. 4 is a plot illustrating the relationship which exists between the voltage developed by each variable delay device with respect to deviations from its midrange position.

Consequently, in order to practice the invention, network 16 in combination with variable delay device 11 must provide a voltage on line 40 which is related to the position of the variable delay device in a manner generally shown by the curve in FIG. 4. The polarity of the curve, that is whether the voltage is positive for maxmium delay and negative for minimum delay or vice versa, is entirely immaterial to the invention and is chosen solely on the basis of producing the proper change in the frequency of oscillator 14. Polarity of the curve should be chosen so that an increase in the delay of variable delay 11 will cause an increase in the frequency of oscillator 14. The desired characteristics of the curve can be mathematically described as follows: $f(-x)=-f(x)$, and $|df/dx|$ increases in value for increasing values of $|x|$. There are many types of realizable circuits which can provide this type of function. For example, if resistance 60 in the variable delay device is linear along the length of the delay line and has a value equal to 2R, then operation of the variable delay into a network 16 having an input impedance of $r$ will provide a voltage at its output which can be described by the equation $$v=\frac{Vx}{1+\frac{R}{4r}(1-x^2)},\ |x|\leq 1$$

This equation may be in the form of the power series in $x$, $$v=\frac{Vx}{1+a}\sum_{n=0}^{\infty}b^nx^{2n},\ a=\frac{R}{4r}>o \text{ and } o<b=\frac{a}{a+1}<1$$

which is clearly of the type required for the instant invention. As can be seen from the power series form of the equation, nonlinearity of the type which is desired can be obtained by making $r$ the input impedance of network 16, finite in value, in the order of the value of resistance 60.

Rather than depending solely on the impedances, network 16 can provide even greater emphasis of the type desired if constructed as a semiconductor network having a nonlinear gain characteristic and known in the art as an expandor. See, for example, "A Companded Coder for an Experimental PCM Terminal" by H. Mann, H. M. Straube, and C. P. Villars, Bell System Technical Journal, January 1962, page 173. Or in the alternative, resistance element 60 can be constructed so as to have a nonlinear rate of change in resistance versus length with the rates of change at its ends greater than the rate of change in its midrange; as a result, the voltage on line 15 would be related to delay device position in the same way as shown in FIG. 4 for the voltage on line 40.

Regardless of the means which is used to achieve a voltage at the output of network 16 which is related to the variable delay device position in accordance with the mathematical relations described hereinabove, the end result is to cause the variable delay devices which are near their extreme positions to have dominant influences in changing the frequencies of the oscillators in directions which will in turn result in changing the variable delay devices toward their midrange positions.

It is to be understood that the above-described arrangements are illustrative of the application of the principles of the invention. Numerous other arrangements may be devised by those skilled in the art without departing from the spirit and scope of the invention.

What is claimed is:

1. In a time division multiplex communication system comprising a plurality of switching centers, each of which is connected by incoming and outgoing communication links with at least one other center of said plurality, means at each center for governing sequential operations at said each center which comprises a source of oscillations of controllable frequency, a controllable variable delay device individual to each of said incoming communication links and connected in tandem therewith, means for controlling each variable delay device so as to maintain substantial phase agreement between the output of said each variable delay device and the oscillations from said source of oscillations of controllable frequency, means individual to each delay device for developing a potential whose magnitude is a nonlinear function of the deviation of said delay device from its midrange position, said nonlinear function, $f(x)$, having the mathematical characteristics of the absolute magnitude of its derivative, $|f'(x)|$, being an increasing function for increasing values of $|x|$ and $f(-x)$ being equal to $-f(x)$ where $x$ is proportional to deviation from the midrange position, summation means having multiple inputs each one of which is connected to receive the developed potential of a delay device within said each center, and means for controlling the frequency of said source of oscillations in response to the output of said summation means.

2. Apparatus as defined in claim 1 wherein said means individual to each delay device includes a potentiometer having two ends and an arm, a source of positive potential connected to one end of said potentiometer, a source of negative potential connected to the other end of said potentiometer, and means connected to said potentiometer arm for causing the arm to assume positions along the potentiometer in accordance with the delay present in its respective delay device.

3. Apparatus as defined in claim 2 wherein said means individual to each delay device further includes a network whose input is connected to the arm of said potentiometer, the input impedance of said network having a value in the order of the total resistance of said potentiometer.

4. Apparatus as defined in claim 2 wherein said means individual to each delay device further includes an expandor having an input, an output and a nonlinear gain characteristic, means connecting the input of said expandor to the arm of said potentiometer, and means connecting the output of said expandor to said means for controlling the frequency of said source of oscillations.

5. In combination with apparatus as defined in claim 1, means within each switching center for transmitting to remote centers information which indicates the developed potential for each of said delay devices, means within each center for deriving the developed potential for each of the remote delay devices which terminate the outgoing links from said center, a second summation means having multiple inputs each one of which is connected to receive the developed potential for a remote delay device, means for inverting the polarity of the output of said second summation means, and means combining the output of said inverting means and said first-mentioned summation means for controlling the frequency of said source of oscillation.

6. Apparatus as defined in claim 5 wherein said means individual to said delay device includes a potentiometer having two ends and an arm, a source of positive potential connected to one end of said potentiometer, a source of negative potential connected to the other end of said potentiometer, and means connected to said potentiometer arm for causing the arm to assume positions along the potentiometer in accordance with the delay present in its respective delay device.

7. Apparatus as defined in claim 6 wherein said means individual to said delay device further includes a network whose input is connected to the arm of said potentiometer, the input impedance of said network having a value in the order of the total resistance of said potentiometer.

8. Apparatus as defined in claim 6 wherein said means individual to each delay device further includes an expandor having an input, output and a nonlinear gain characteristic, means connecting the input of said expandor to the arm of said potentiometer, and means connecting the output of said expandor to said means for controlling the frequency of said source of oscillations.

9. In a time division multiplex communication system comprising a plurality of switching centers, each one of which is connected by incoming and outgoing communication links with at least one other center of said plurality, means at each center for governing sequential operations at said each center which comprises a source of oscillations of controllable frequency, a controllable variable delay device individual to each of said incoming communication links and connected in tandem therewith, phase comparator means for controlling each variable delay device so as to maintain substantial phase agreement between the output of said delay device and the oscillations from said source of oscillations, means individual to each delay device for developing a signal whose voltage magnitude and polarity are related to the deviation of said each delay device from its midrange delay such that larger changes in voltage magnitude for a given change in delay are obtained when the delay device deviates further from its midrange delay and the signal polarity for a deviation in one direction from midrange is opposite to that of a deviation in the other direction, means for transmitting the signal relating to each variable delay device to the remote center from which the respective incoming communication link originated, and means for controlling the frequency of said source of oscillations at said each center in response to a summation of the signals relating to the variable delay devices within said each center minus a summation of the signals relating to the variable delay devices in remote centers which terminate communication links from said each center to said remote centers.

10. Apparatus as defined in claim 9 wherein said means for developing a signal comprises a potentiometer having two ends and an arm, a source of positive potential connected to one end of said potentiometer, a source of negative potential connected to the other end of said potentiometer, means for causing the arm of said potentiometer to take a position along said potentiometer which is proportional to the fractional part of the total possible delay in said delay device, and network means connected to said arm for providing said signal at its output.

11. Apparatus as defined in claim 10 wherein said potentiometer has a constant change in resistance per change in the position of the arm throughout its entire movement and the input impedance of said network means has a value in the order of the total resistance of said potentiometer.

12. Apparatus as defined in claim 10 wherein said potentiometer has an increased change in resistance per change in the position of the arm as the arm moves from its midrange position toward either end of said potentiometer.

13. Apparatus as defined in claim 10 wherein said potentiometer has a constant change in resistance per change in the position of the arm throughout its entire movement, and said network means is an expandor having a nonlinear gain characteristic.

References Cited

UNITED STATES PATENTS

| | | | |
|---|---|---|---|
| 1,926,169 | 9/1933 | Hyquist | 333—18 |
| 2,056,011 | 9/1936 | Lowell | 325—390 |
| 2,777,054 | 1/1957 | Dahlberg | 325—63 XR |
| 2,986,725 | 5/1961 | Darwin et al. | 179—15 |
| 3,008,087 | 11/1961 | Darwin | 328—72 |
| 3,034,062 | 5/1962 | Bleam | 333—30 XR |
| 3,080,537 | 3/1963 | Tenten | 333—30 |

FOREIGN PATENTS

| | | |
|---|---|---|
| 289,524 | 1/1927 | England. |

ROBERT L. GRIFFIN, Primary Examiner

CARL R. VON HELLENS, Assistant Examiner

U.S. Cl. X.R.

328—72; 333—18, 30